United States Patent
Fonville

(10) Patent No.: US 7,103,957 B2
(45) Date of Patent: Sep. 12, 2006

(54) EXPENDABLE TORQUE CONVERTER ALIGNMENT RING AND ASSEMBLY METHOD

(75) Inventor: Carl E. Fonville, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 287 days.

(21) Appl. No.: 10/700,420

(22) Filed: Nov. 4, 2003

(65) Prior Publication Data

US 2005/0091826 A1    May 5, 2005

(51) Int. Cl.
*B23Q 3/00* (2006.01)
*B32B 3/02* (2006.01)

(52) U.S. Cl. .................... 29/464; 29/407.09; 29/407.1; 29/436; 29/469; 428/66.6; 428/66.7; 403/372

(58) Field of Classification Search ................ 29/406, 29/407.09, 407.1, 436, 437, 453, 464, 469, 29/525; 403/365, 367, 368, 372, 345; 428/66.4, 428/66.6, 66.7
See application file for complete search history.

(56) References Cited

U.S. PATENT DOCUMENTS

| | | | | |
|---|---|---|---|---|
| 2,951,721 A | * | 9/1960 | Asp | 277/500 |
| 2,956,826 A | * | 10/1960 | Nord | 403/368 |
| 2,989,327 A | * | 6/1961 | Heinrich | 403/372 |
| 4,295,753 A | * | 10/1981 | Luerken et al. | 403/365 |
| 4,951,954 A | * | 8/1990 | MacNeill | 277/627 |
| 5,158,269 A | * | 10/1992 | Hein et al. | 267/220 |
| 5,501,122 A | * | 3/1996 | Leicht et al. | 74/606 R |
| 5,678,609 A | * | 10/1997 | Washburn | 138/107 |
| 5,782,570 A | * | 7/1998 | Masterson et al. | 403/13 |
| 5,961,246 A | * | 10/1999 | Mitsubori | 403/365 |
| 6,694,687 B1 | * | 2/2004 | Elmer | 52/308 |

FOREIGN PATENT DOCUMENTS

GB        2069660 A    *    8/1981

* cited by examiner

*Primary Examiner*—Essama Omgba
(74) *Attorney, Agent, or Firm*—Christopher DeVries

(57) ABSTRACT

In a preferred embodiment, an expendable alignment ring is adapted for centering opposing conical surfaces of a transmission torque converter and an engine crankshaft. The ring has an annular body formed of a thermoplastic such as high density polyethelene. The body has first and second ends formed by axially spaced inner and outer coaxial conical surfaces extending between inner and outer peripheries. The ring is installed over a pilot of the torque converter so that the conical ends of the ring align the conical surfaces of the torque converter and the crankshaft during assembly to center the torque converter relative to the crankshaft. Upon assembly of the torque converter to the crankshaft, the alignment ring is slightly compressed and provides the mechanism for precise alignment of the torque converter to the crankshaft. During subsequent engine operation, the alignment ring softens and is flattened or destroyed so as not to interfere with axial motion of the pilot during ballooning of the torque converter.

5 Claims, 4 Drawing Sheets

EXPENDABLE TORQUE CONVERTER ALIGNMENT RING AND ASSEMBLY METHOD

TECHNICAL FIELD

This invention relates to centering a torque converter relative to an engine crankshaft and a single use alignment ring for use in performing the method.

BACKGROUND OF THE INVENTION

A torque converter to crankshaft assembly includes a transmission torque converter and an engine crankshaft. The torque converter may have an axially extending pilot with an outer end and a conical surface spaced inward from the outer end. A radial drive plate is bolted to the crankshaft and to mounting bosses on the face of the torque converter to carry drive torques between the engine and torque converter. The crankshaft has a recess for receiving the outer end of the pilot, and a conical chamfer surface at an outer end of the recess to engage the conical surface of the pilot.

Two methods of assembling a torque converter to a crankshaft are commonly used. One method is applied to a butt joint pilot converter. This method involves inserting the pilot of the torque converter into the recess of the crankshaft until the conical surface of the pilot directly engages the conical surface of the chamfer. During assembly, the contact between the conical surface of the pilot and the chamfer provides the alignment that centers the torque converter relative to the crankshaft. During engine operation, as the torque converter balloons, the conical surface of the torque converter pilot applies axial thrust on the crankshaft, requiring the engine to have high strength crankshaft thrust bearings to deal with the direct and indirect thrust loads created by the ballooning of the torque converter.

The second method is applied to a floating joint pilot converter. This involves inserting the pilot of the torque converter within the recess of the crankshaft so that the conical surface of the pilot is spaced axially from the conical surface of the chamfer. During assembly, the chamfer surface and the conical surface do not engage to center the torque converter within the crankshaft. As a result, the alignment by this method varies because of required clearances and tolerances. During engine operation, the clearance between the crankshaft and the torque converter provides expansion room for torque converter ballooning. As a result, the engine can use standard crankshaft thrust bearings to deal with indirect thrust loads of the torque converter.

A torque converter to crankshaft assembly having the installation benefits of a butt joint pilot converter and the expansion benefits of floating joint pilot converter is desired.

SUMMARY OF THE INVENTION

The present invention provides an expendable alignment ring adapted for centering opposing annular surfaces of an engine crankshaft and a transmission torque converter wherein the opposing annular surfaces are sloped surfaces of revolution centered on an axis. The term sloped surfaces of revolution is intended to include both conical and curved surfaces.

The alignment ring is formed of a material that is solid at room temperature but compressible when subjected to end loads beyond a prescribed limit. In an exemplary embodiment, the alignment ring is formed of a thermoplastic such as high density polyethylene (HDPE) which softens or melts at temperatures reached during engine operation. The alignment ring has an annular body having first and second ends formed by axially spaced inner and outer coaxial sloped annular surfaces of revolution centered on an axis and extending between inner and outer peripheries. The sloped annular surfaces of the ring may be conical or curved.

The inner periphery of the ring is adapted to fit over a circumferential surface of a torque converter pilot. The first end of the ring is adapted to engage a sloped guide surface of the pilot spaced from its outer end. The second end of the ring is adapted to engage a chamfer surface at an outer end of a recess in the engine crankshaft.

Before assembly of the torque converter to the crankshaft, the alignment ring is forced onto the pilot of the torque converter. During assembly, as the pilot is inserted into the recess of the crankshaft, the alignment ring is slightly compressed, forming a butt joint between the crankshaft chamfer surface and the sloped surface of the pilot. This centers the torque converter relative to the crankshaft during bolting of the drive plate to the torque converter to complete the assembly. During subsequent engine operation, the thermoplastic material softens or melts at normal operating temperatures so that ballooning of the torque converter does not apply thrust loads on the crankshaft.

These and other features and advantages of the invention will be more fully understood from the following description of certain specific embodiments of the invention taken together with the accompanying drawings.

DESCRIPTION OF THE PREFERRED EMBODIMENT

Figure 1:
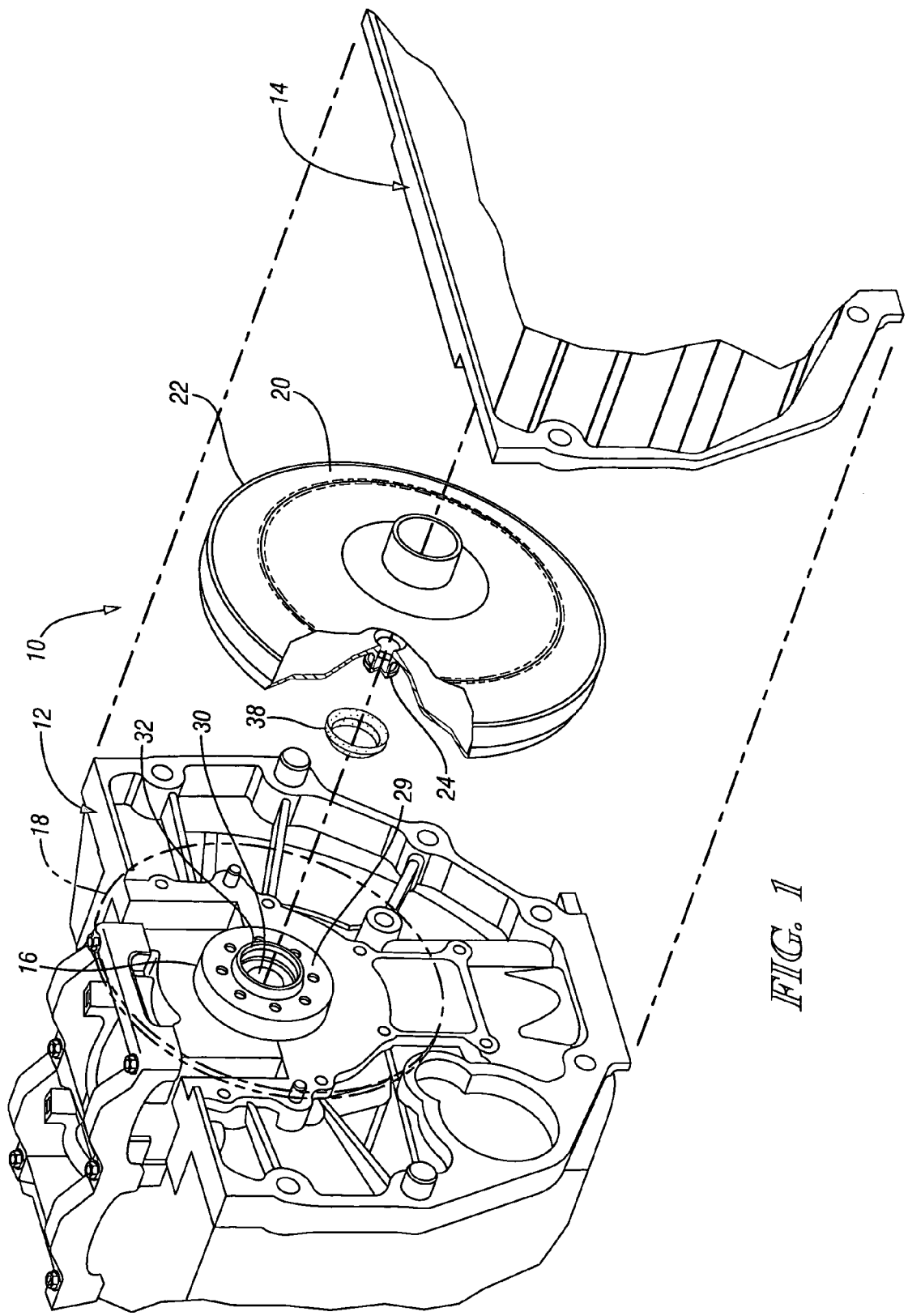
FIG. 1 is a pictorial view of an exploded automotive drive train formed according to the invention.

Referring first to FIG. 1 of the drawings in detail, numeral 10 generally indicates a portion of an automotive drive train including an internal combustion engine 12 and a transmission 14. When the engine 12 and the transmission 14 are joined together, rotation of the engine crankshaft 16 is relayed to the transmission through components including a flexplate 18 and a torque converter 20.

Figure 4:
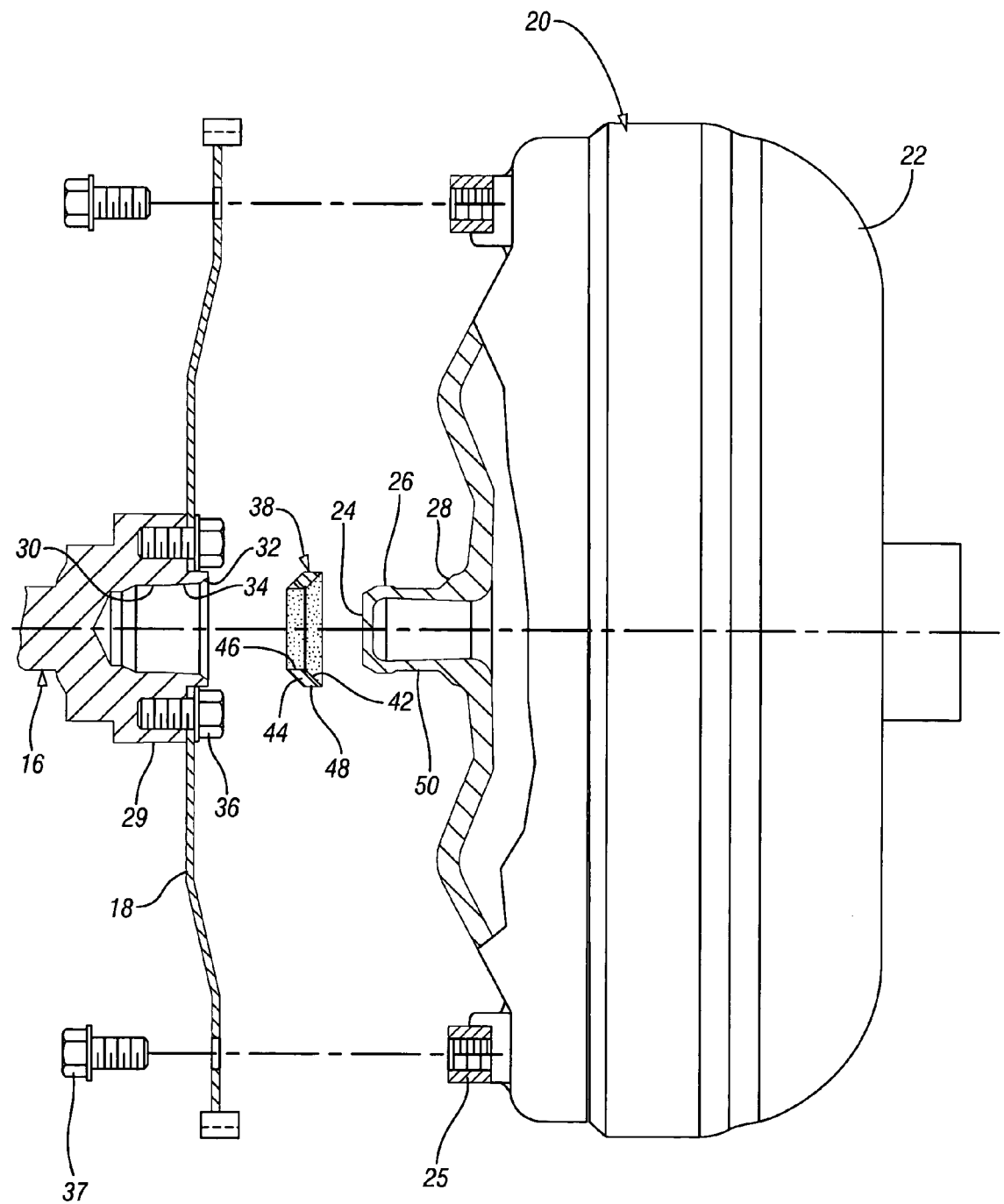
FIG. 4 is an exploded cross-sectional view of the drive train including the alignment ring.
Figure 5:
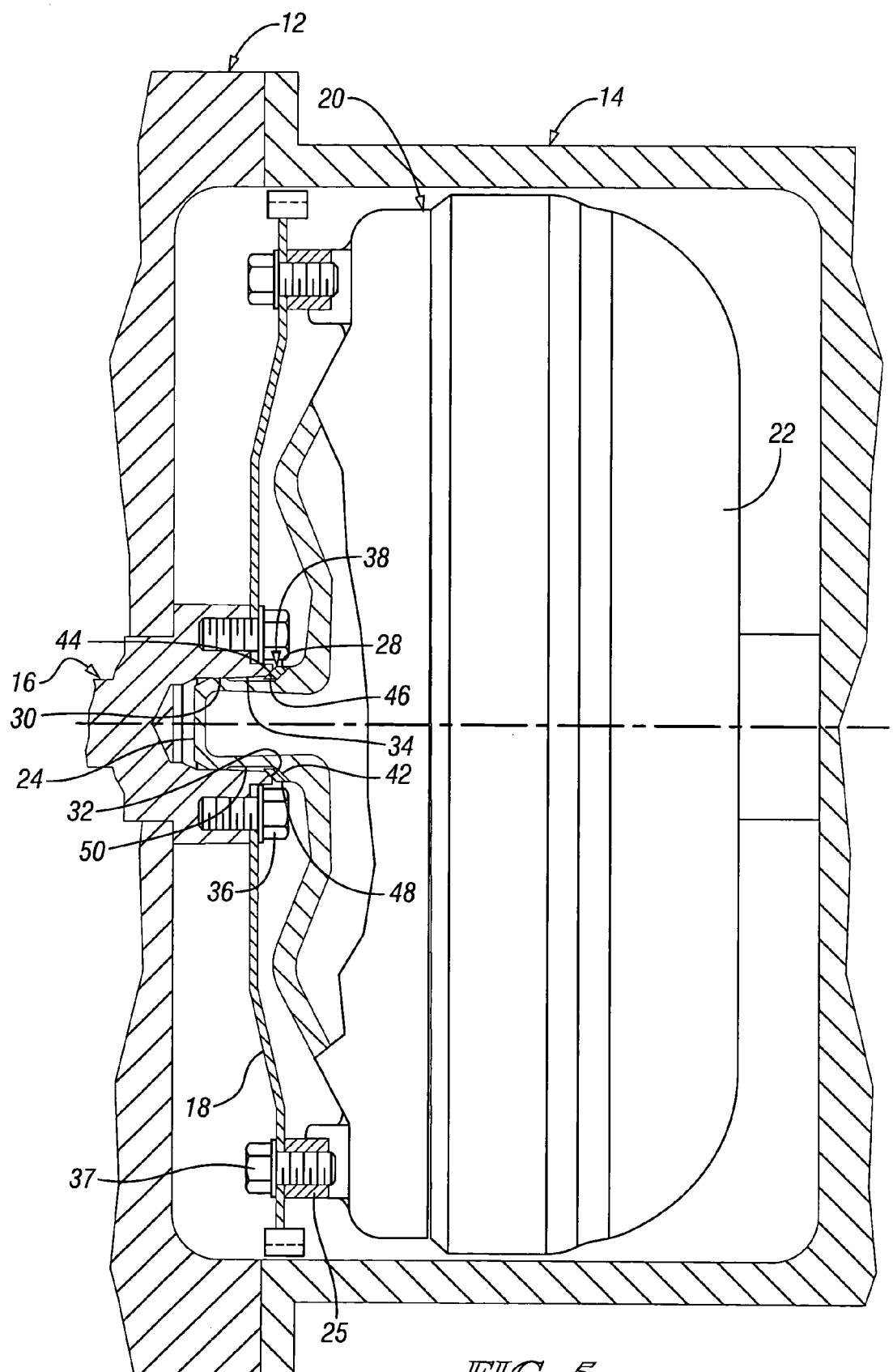
FIG. 5 is a cross-sectional view of the assembled drive train.

In the embodiment illustrated in FIGS. 1, 4 and 5, the torque converter 20 extends axially from the transmission 14 toward the engine. The torque converter has a body 22 with an axially extending pilot 24 and a plurality of threaded bosses 25 extending from the body surrounding the pilot for connection to the crankshaft 16. The pilot 24 has an enlarged outer end 26 and a conical (sloped) guide surface 28 spaced inward from the outer end.

The crankshaft 16 has an end flange 29 that extends axially from the engine 12 and has a recess 30 for receiving the outer end 26 of the pilot 24. A conical chamfer 32 is provided at an outer end 34 of the recess 30. The flexplate 18 is fixed to the flange 29 by bolts 36 and extends radially outward adjacent the torque converter body 22. The flexplate 18 is fixed to the bosses 25 of the torque converter by bolts 37.

Figure 2:
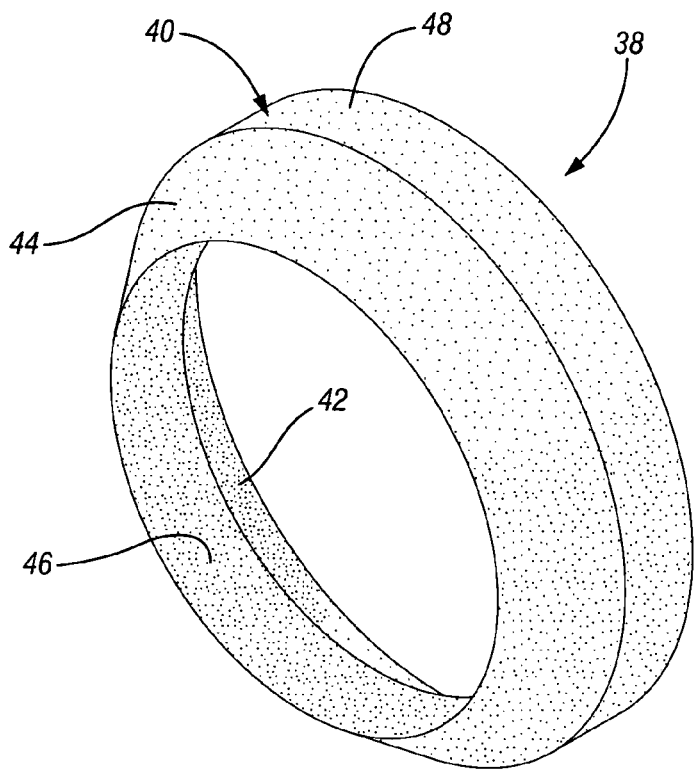
FIG. 2 is a pictorial view of an exemplary alignment ring.
Figure 3:
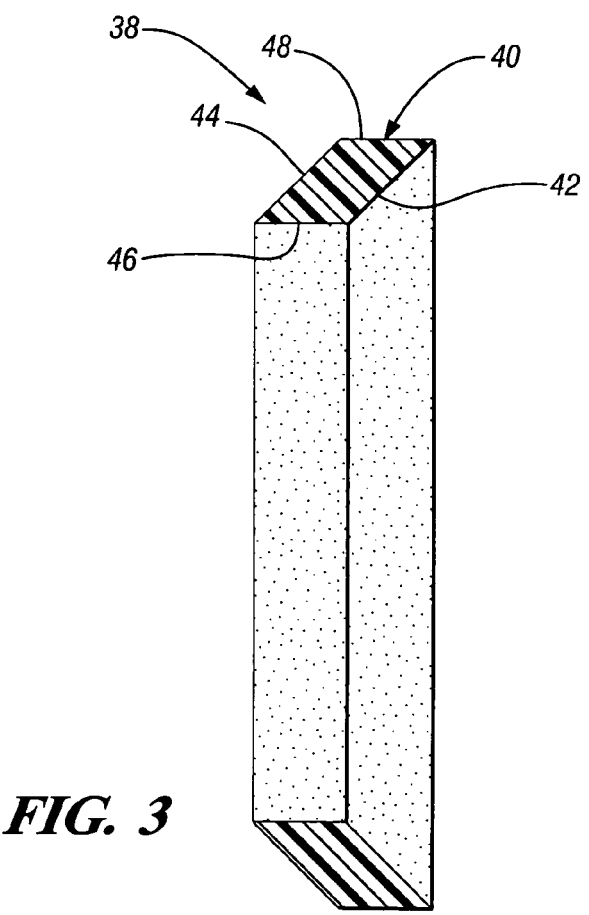
FIG. 3 is a diametral cross-sectional view of the alignment ring.

The invention includes an alignment ring 38, best shown in FIGS. 2 and 3. The ring 38 is formed of a material that is solid at room temperature but is compressible when subjected to excessive end loads created between the crankshaft 16 and the torque converter 20. The material is preferably a thermoplastic that softens or melts at temperatures to which the ring 38 is exposed during engine operation. In an exemplary embodiment, the ring 38 is formed of a thermoplastic such as high density polyethylene (HDPE).

The ring 38 has an annular body 40 including first and second ends 42, 44 formed by axially spaced inner and outer coaxial conical surfaces extending between inner and outer peripheries 46, 48. The inner periphery 46 is adapted to fit over a circumferential surface 50 of the pilot 24. When the ring 38 is installed on the pilot 24, the ring first end 42 engages the conical guide surface 28. When the pilot 24 is inserted into the recess 30, the ring second end 44 engages the conical chamfer 32. Alternatively, the ends 42, 44 of the ring 38 may, if desired, be configured to accommodate alternative mating surfaces of the torque converter and crankshaft.

Before assembly of the transmission 14 to the engine 12, the alignment ring 38 is forced over the enlarged outer end 26 of the pilot 24. The ring may then be positioned near the conical guide surface 28 so that the first end 42 is adjacent the conical guide 28 as shown in FIGS. 4 and 5. The pilot 24 of the torque converter 20 is then aligned with the recess 30 of the crankshaft 16 and inserted into the recess 30 until the conical second end 44 of the ring 38 engages the chamfer surface 32 of the recess 30.

When the conical ends 42, 44 of the ring 38 engage the conical chamfer 32 and the conical guide surface 28 the contact forces the pilot toward the center of the recess until the pilot 24 is centered within the recess 30 of the crankshaft 16. The torque converter 20 is then bolted to the flexplate 18 while the alignment ring 38 and the conical surfaces 28, 32 of the torque converter and crankshaft keep the pilot centered within the recess.

After assembly is complete, the alignment ring 38 is no longer required, however it remains within the drive train 10. Thus, the alignment ring must be deformable in response to end loads between the crankshaft 16 and the torque converter 20 created by torque converter ballooning. Preferably, the alignment ring 38 softens or melts at higher temperatures so that during engine operation the ballooning of the torque converter will permanently compress or displace the ring.

The foregoing is an example illustrating an assembly having conical surfaces, however, it should be understood that the invention includes in general sloped surfaces of revolution which include curved surfaces as well as the conical surfaces of the above described embodiment. Ideally, the surfaces of the ring engaging the opposing surfaces of the torque converter and the crankshaft are mating surfaces which engage one another over their full extent. However, surfaces engaging over less than their full extent are included within the scope of the invention.

The foregoing description is directed, as an example, to assembling a torque converter having a pilot and a crankshaft having a recess. However, it should be understood that other configurations such as a torque converter having a recess and a crankshaft having a pilot may be assembled using the same process. Furthermore, it should also be understood that other drive train configurations such as a transverse mounted engine where the torque converter is not directly attached to the transmission may be assembled using the same process.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A method of centering a torque converter and an engine crankshaft at a connecting interface, the torque converter having a pilot with an outer end and a conical guide surface spaced inward from the outer end, and the crankshaft having a recess for receiving the pilot and a conical chamfer at an outer end of the recess, the conical guide surface and the conical chamfer being positioned in spaced opposing axial alignment upon connection of the torque converter and the crankshaft, the method comprising:

providing an alignment ring having an annular body including first and second ends formed by axially spaced inner and outer coaxial conical surfaces extending between inner and outer peripheries, the body being formed of a material that is solid at room temperatures but is compressible when subjected to end loads beyond a prescribed limit;

placing the ring onto the pilot;

centering the torque converter to the crankshaft by inserting the pilot into the recess such that the conical guide surfaces of the pilot and the conical chamfer engage the conical surfaces of the alignment ring which operates to center the pilot within the recess; and fastening the torque converter to the engine while the pilot and the recess remain centered.

2. A method as in claim 1 wherein the material of the ring softens at engine operating temperatures.

3. A method as in claim 2 wherein the material of the ring is thermoplastic.

4. A method as in claim 3 wherein the thermoplastic is high density polyethylene.

5. A method as in claim 1 wherein the method includes forcing the alignment ring over an enlarged end of the pilot to retain the ring on the pilot prior to assembly.

* * * * *